Aug. 21, 1928. 1,681,490
F. B. LOMAX
METHOD OF MAKING SIRUPS
Filed May 3, 1926  2 Sheets-Sheet 2
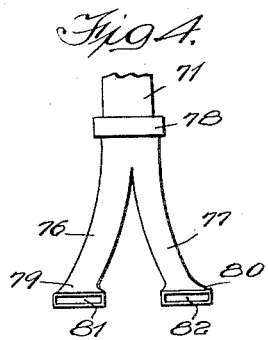
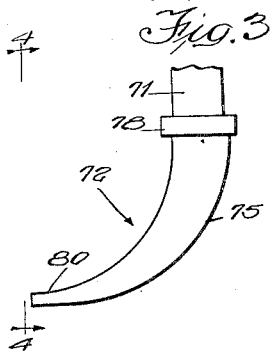
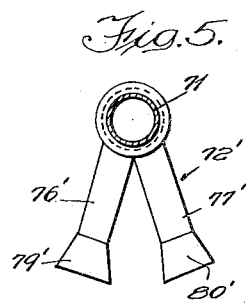
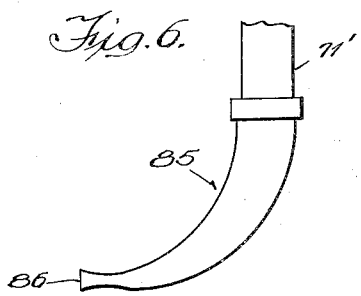
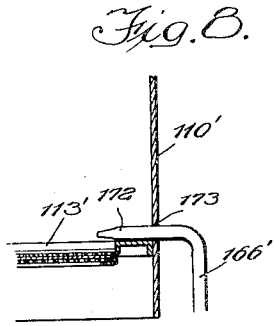
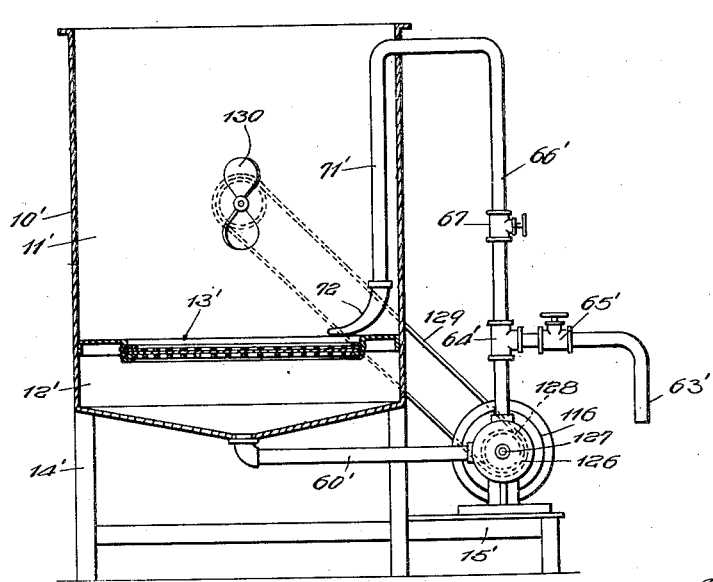
Witnesses:
William P. Kilroy
Harry R. L. White
Inventor:
Frank B. Lomax
By Brown, Boettcher & Dienner
Attys Patented Aug. 21, 1928.

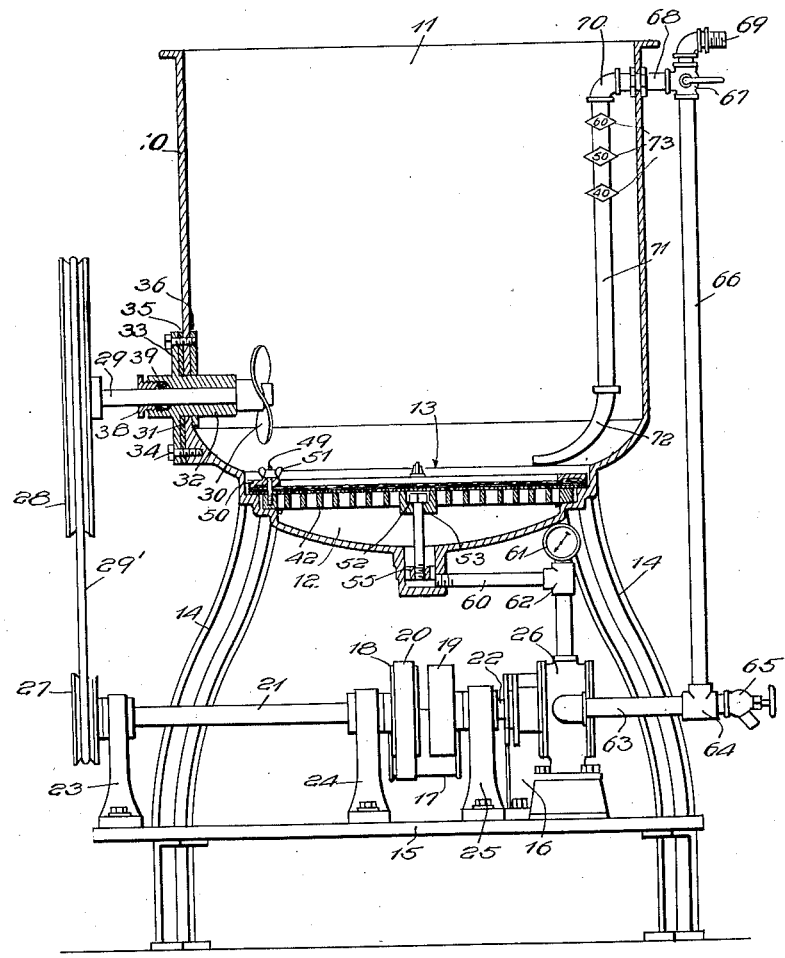

1,681,490

UNITED STATES PATENT OFFICE.

FRANK B. LOMAX, OF CHICAGO, ILLINOIS.

METHOD OF MAKING SIRUPS.

Application filed May 3, 1926. Serial No. 106,323.

My invention pertains to filtering apparatus and more particularly to an improved method of and apparatus for making filtered solutions.

The present invention is particularly useful in connection with sirup makers such as that disclosed in my Patents 1,565,611 and 1,597,911 issued December 15, 1925, and August 31, 1926, respectively.

Now it is well known to sirup manufacturers that bacteria is the principal cause of fermentation which is responsible for much loss in sirup manufacture. Obviously the life and growth of the bacteria depend upon the supply of air in the sirup. Therefore, it will be evident that by removing air from the solution or sirup, this fermentation—causing bacteria—can be destroyed. The process of removing air from the sirup is termed a de-aeration process by sirup manufacturers. Heretofore, however, it has been necessary in order to liberate the air from the sirup to employ a separate machine called a de-aerator.

I propose to provide an improved apparatus for making solutions such as sirup wherein the solution is contemporaneously filtered and de-aerated.

From experience, I find that in addition to preventing fermentation, de-aeration actually tends to improve the flavor of the sirup. Moreover the elimination of oxygen from the sirup assures absolute uniformity of the product.

Also, besides destroying bacteria that causes fermentation losses de-aeration of the solution or sirup makes it easier for the sirup to absorb carbonic acid gas thus eliminating foaming when the sirup is bottled. Of course, it is to be understood that although I have disclosed my present improvement in the art as being particularly adapted for the manufacture of sirup, it may be used equally well for manufacturing and filtering other analogous liquids.

In accordance with the general features of the present invention I provide a solution forming apparatus including a container divided into two compartments by a filtering barrier or partition and a suction pump connected to the space below the barrier adapted to create a partial vacuum in the said lower space. This vacuum results in the liquid above the barrier being subject to a pressure difference which causes the liquid to be forced through the filter. Now, inasmuch as the filtering barrier includes a filter of paper, the pores of which are relatively small, the liquid in being forced therethrough is necessarily separated into comparatively fine molecules of air and liquid. The molecules of air are sucked from the liquid by the suction device, thus resulting ultimately in the liberation of a great portion of the free air in the liquid or sirup. In fact, the air being liberated from the liquid can be actually observed escaping from the mass of liquid in the container in vicinity of the return pipe as I shall more fully explain hereinafter.

Now of course I desire it understood that by free air I mean that air or gas contained in the liquid which is capable of removal by suction. Obviously, the suction will also remove those molecules of air which are on the verge of being dissolved in the liquid.

I also propose to provide an improved process of forming a filtered solution which permits of the automatic priming of the suction device before the same is placed into operation.

Still another feature of my invention pertains to the utilization of the filtered solution elevated to a position above the filtering barrier by the suction pump for the purpose of agitating the liquid and solute above the barrier to prevent the solute from caking on the top of the barrier.

It is evident that upon the pump being operated to create a partial vacuum below the barrier, the solute on the barrier will be sucked into tight engagement with the top of the barrier. Obviously, a certain amount of this solute or sugar will penetrate the pores of the filter. The remainder of the solute or sugar will tend to cake on top of the barrier. Of course, in order for the pump to be effective to cause liquid to be forced through the filtering barrier, it is absolutely necessary that caking of the solute on the barrier be eliminated. Moreover, if the caking condition is not broken up or obviated, no appreciable amount of liquid will get through the filter.

As disclosed in my aforesaid Patent 1,597,911, I have solved the difficulty by providing means for constantly agitating the solute or sugar above the barrier thus preventing it from caking thereon. The sugar or solute sucked into the pores of the filter will be gradually dissolved in the liquid being sucked therethrough. In other words, the liquid being sucked through the barrier will gradually wear down any other solute or sugar in the pores of the filter.

In my Patent 1,597,911 I have disclosed an agitator positioned above the barrier which is adapted to be constantly operated by the suction pump. This agitator serves to at all times maintain the liquid and solute above the barrier in a constant state of agitation. In the present patent application I provide, in addition to the agitator, means associated with the return pipe connected to the suction pump for utilizing the liquid elevated by the pump to a position above the barrier for the purpose of stirring up the sugar or solute disposed immediately over the barrier. I preferably provide the end of this return pipe or tube with a nozzle which is adapted to project the returned filtered solution clear across the upper surface of the filtering barrier. I have disclosed several forms of nozzles adapted for use in conjunction with the return pipe of my sirup maker. The jets or sprays of liquid emanating from these nozzles are adapted to sweep the sugar from the top of the barrier. Thus it will be seen that I have provided a very effective way of preventing the sugar on the barrier from caking.

Other objects and advantages of my invention will more fully appear from the following detailed description taken in connection with the accompanying drawings which illustrate several embodiments thereof and in which, Figure 1 is a view of one form of my sirup maker partly in section and illustrating clearly the position of the nozzle associated with the return pipe;

Fig. 2 is a fragmentary sectional view illustrating the construction of my filtering barrier;

Fig. 3 is an enlarged view of the nozzle construction illustrated in Figure 1;

Fig. 4 is a view of the nozzle illustrated in Figure 3 taken substantially on the line 4—4 of Figure 3 looking in the direction indicated by the arrows;

Fig. 5 is a plan view of a modified form of nozzle;

Fig. 6 is a plan view of still another form of nozzle adapted for use in conjunction with my sirup maker;

Fig. 7 is a view partly in section of a modified form of sirup maker such as that illustrated in my aforesaid co-pending application; and Fig. 8 is a more or less diagrammatic illustration of a modified nozzle construction.

Referring now to the drawings in detail, in which like reference numerals designate similar parts throughout the several views, 10 denotes generally a container made of any suitable metallic material and preferably provided with a coat of enamel. The tank or container 10 is separated into two compartments 11 and 12 by means of a filtering barrier 13. The tank 10 is supported upon a plurality of legs 14 preferably three in number. The legs 14 may be made of cast iron or any other suitable material. Carried by the legs 14 is a shelf 15 upon which is disposed the operating mechanism of the sirup machine.

Mounted upon the shelf 15 is a motor 16 adapted to drive a pulley 17 in a manner such as that disclosed in my previously mentioned prior patent. The pulley 17 in turn is adapted to drive a pair of pulleys 18 and 19 through the means of a belt 20. As illustrated in Figure 1, the pulley 17 is connected by the belt 20 with the pulley 18 to drive the shaft 21 upon which the pulley 18 is mounted. Obviously, by shifting the belt 18 onto the pulley 19 the motor can be made to drive the pulley 19 and its associated shaft 22. The shaft 21 is journaled in bearings 23 and 24 carried by the shelf 15. The shaft 22 is journaled in a bearing 25 carried by the shelf 15 and is adapted to drive a gear pump 26. Although I preferably employ a gear pump in conjunction with my apparatus, it is of course, to be understood that any other analogous suction device may be employed in place of the gear pump. The outer end of the shaft 21 carries a small grooved pulley 27 which may be of any usual or suitable construction.

The grooved pulley 27 is adapted to drive a relatively large grooved pulley 28 through the means of a belt 29'. The grooved pulley 28 is splined to a shaft 29 which extends through the wall of the tank 10. The end of the shaft 29 inside of the tank 10 carries a small propeller or agitator 30. Surrounding a portion of the shaft 29 intermediate its ends is a bushing-like element 32 which extends through an opening 31 in the wall of the tank 10. The outer end of the bushing 32 is formed into an enlarged plate-like portion 33 which is secured to the wall of the casing by means of bolts 34. If it is desired, a ring-like washer member 35 may be disposed intermediate the plate portion 33 and the outer wall of the tank. A plate 36 may also be disposed inside of the tank and secured to the wall thereof by means of the bolts 34 previously described. The shaft 29 is provided with a suitable gland 38 adapted to cooperate with a recessed end 39 of the bushing 32. The bushing 32 in reality constitutes a bearing for the shaft 29 which is adapted to actuate the agitator or propeller 30.

Referring now again to the filtering barrier 13, it will be observed that this barrier is associated with a pair of annular shoulders 40 and 41 in the tank 10. The barrier 13 includes a circular base member 42 provided with a plurality of apertures 43 through which liquid is adapted to pass. This member 43 is supported upon the annular shoulder 40 formed in the tank 10. The member may be made of any suitable material and I preferably manufacture it from a bronze casting which may be silver plated if it is so desired. Positioned on top of the member 42 is a perforated disc or plate 45 preferably made of Monel metal. This plate or disc 45 is preferably disposed on top of the shoulder 41. It is of course to be understood that the distance separating the shoulder 40 from the shoulder 41 is substantially equal to the thickness of the member 42. Positioned on top of the disc 45 are a plurality of layers of filtering material comprising a layer 46 of relatively fibrous felt, a layer of filter paper 47 and a layer of felt 48. The three layers 46, 47 and 48, plus the disc 45, and the member 42, constitute the filtering barrier of my sirup machine, the porosity of this barrier, as a whole, being of the proper degree of fineness to effect the separation of the air from the liquid passing through the barrier. While I have disclosed a filtering and separating barrier of a particular construction, I do not limit myself to this specific type of barrier. Any other barrier possessing the required degree of fineness of porosity, and otherwise suitable for use with the particular liquid being treated, can be used.

The member 42 is equipped with a plurality of integral bolts 49 which serve as guide pins for the proper positioning of the various layers of filtering material. Positioned on top of the layer 46 is an annular clamping ring 50 through which the bolts 49 extend. The layers of filtering material and the disc 45 are clamped to the member 42 and to the shoulder 41 by means of wing nuts 51 threaded onto the bolts 49.

The plate or member 42, as best shown in Figure 1, is equipped with a concentric pocket 52 provided with a concentric opening 53 through which extends a bolt 54. The head of the bolt 54 is adapted to be wholly disposed in the pocket 52. The lower end of the bolt 54 is provided with a plurality of threads and is adapted to be threaded into a portion 55 of the bottom of the tank 10. Thus it will be seen that the barrier 13 may be tightly clamped to the bottom of the tank or container 10 to divide the container into the two previously mentioned compartments 11 and 12.

The compartment 12 of the tank 10 is connected to the inlet side of the pump 26 by means of a pipe line 60. This pipe line 60 may be provided with any suitable pressure gage for denoting the degree of vacuum in the lower part of the tank when the pump 26 is in operation. This indicating device 61 may be graduated in terms of inches of mercury. The pipe line 60 preferably includes two sections of piping connected at their inner sections by means of a T 62. The outlet or discharge of the pump 26 is connected to a pipe line 63 which terminates in a T 64. One side of the T 64 is connected to a spigot or faucet 65 from which liquid may be withdrawn from the system whenever it is desired. The other side of the T 64 is connected to a pipe line 66 extending upwardly alongside of the tank 10. The upper end of the pipe line 66 is connected to a T-shaped valve 67 which has two pipe connections 68 and 69. By operating the valve, the pipe line 66 may be connected to either of the connections 68 or 69. Normally, the pipe line 66 is connected to the connection 68 which extends through the wall of the tank 10 and is provided inside of the tank 10 with a pipe elbow 70.

Connected to this pipe elbow 70 is a vertical pipe 71 which extends downwardly in the tank 10 alongside of the wall thereof. Secured to the lower end of this pipe 71 is a nozzle designated generally by the reference character 72. The pipe 71 may, if it is so desired, have secured thereto markers 73 by means of which the quantity of liquid in the tank 10 may be determined.

In Figures 3 and 4, I have illustrated, on a somewhat enlarged scale, the nozzle 72. In Figures 5 and 6, I have illustrated modified forms of nozzles which may be substituted for the nozzle 72 if it is so desired. The nozzle 72 includes an elbow-like portion 75 preferably composed of two legs 76 and 77, the portion 75 of the nozzle 72 is arcuate in shape and is preferably secured to the lower end of the pipe 71 by means of threads on the end of the pipe adapted to cooperate with the threaded ring portion 78 of the nozzle 72. Each of the legs 76 and 78 are tubular and have a substantially flat end 79—80. Each of the ends 79 and 80 are provided with a rectangular orifice 81—82. The orifices 81 and 82 are somewhat restricted and hence cause the liquid passing through the nozzle 72 to be projected onto the top of the filtering barrier with considerable force.

In Figure 5, I have illustrated a nozzle 72′. The primary difference between the nozzle 72′ and the nozzle 72 resides in the fact that the legs 76′ and 77′ of the nozzle 72′ diverge. The diverging legs 76′ and 77′ are each provided with a substantially flat end 79′—80′. This nozzle 72′ is adapted to project liquid across the top of the filtering barrier in much the same manner as the nozzle 72.

In Figure 6, I have illustrated a Venturi nozzle 85 secured to an end of the pipe 71′. The orifice 86 is preferably disposed in a plane at right angles to that of the pipe line 71′. This nozzle is adapted to project liquid with a relatively high velocity into the mass of solute and liquid on top of the filtering barrier.

The operation of my sirup machine illustrated in Figure 1 is briefly as follows:

First, the tank 10 is filled with a suitable quantity of liquid such as water. The liquid is, of course, free to percolate through the filtering barrier 13. After filling the tank 10, I preferably operate the pump 26 to circulate the liquid or water through the filter 13 several times. This circulating of the water tends to remove any foreign matter in the water, which matter will remain on top of the filtering barrier 13. The pores of the filtering barrier, especially of the layer of paper, are so small that it is impossible for any matter to reach the pump 26 and thus interfere with the operation of the pump. In prior constructions, considerable trouble has been experienced with the pump due to foreign matter such as nails, strings, and the like, getting into the gearing of the pump. This deleterious feature is absolutely prevented in my construction.

After the water has been thoroughly filtered, the pump is discontinued and rendered inoperative. It will then be found that liquid is present in both the compartments 11 and 12. The liquid in the compartment 12 automatically primes the pump 26 ready for the next operation of the pump.

The next step is to place solute or sugar inside of the container 10 above the filtering barrier 13. Subsequent to this operation, the belt 20 is shifted onto the pulley 18 in a position ready to actuate the agitator or propeller 30. Then the motor 16 is set into operation causing the agitator 30 to be actuated. This agitator 30 serves to completely dissolve the sugar in the water in the compartment 11.

As soon as all the sugar has been found to be dissolved in the water, the belt 20 is shifted from the pulley 18 onto the pulley 19 to actuate the pump 26. Now, it is to be understood that the water or liquid in the compartment 12 has not as yet been mixed in with the solution in the compartment 11. This water, as previously mentioned, automatically primes the pump 26. Therefore, as soon as the pump 26 is put into operation, it will serve to pump the liquid in the compartment 12 into the upper compartment 11 where it is mixed with the solution.

Upon the removal of the liquid from the compartment 12, the pump serves to create a partial vacuum in the compartment 12. This results in the solution 11 above the filtering barrier 13 being subjected to a pressure difference. The pressure difference forces the solution through the pores of the filtering barrier 13 and into the lower compartment 12.

Now as previously mentioned since the filtering barrier 13 includes a layer of filter paper 47 the pores of which are relatively small the liquid in being forced therethrough is necessarily separated into fine molecules of air and liquid. The molecules of air are sucked from the molecules of liquid thus resulting ultimately in the liberation of a great proportion of the free air in the liquid or sirup. In fact, the bubbles of air can be observed escaping from the nozzle 72 and around the elbow 70 in my novel construction. The phenomena of the escaping molecules of liberated air is sufficiently great to create a mist around the top periphery of the tank 10. Also, I find that the sirup made with my novel machine absorbs carbonic acid gas much easier than do other sirups thus eliminating foaming when the sirup is bottled. This deaeration of the sirup prevents the growth of bacteria in the sirup and thus prevents, to a considerable degree, fermentation of the sirup.

Another advantage of my sirup machine resides in the fact that the liquid being returned to the compartment 11 by the pump 26 has to pass through the nozzle 72 which projects the incoming liquid with considerable force onto the top of the filtering barrier 32. In fact, this nozzle 72 serves to cause the incoming liquid to be swept clear across the top of the barrier thus agitating any solid matters that may be present on top of the barrier and preventing this solid matter from caking thereon. By preventing the aforesaid caking action, the pump is free to force a maximum of liquid through the barrier in a minimum of time. That is to say, by eliminating the caking of any matter on top of the barrier, the pressure difference created by the pump is enabled to react upon the liquid in the compartment 11 to force the same downwardly through the barrier. Any one of the nozzles illustrated in Figures 3 to 6, inclusive, may be used in conjunction with the pipe 71 to accomplish the desired results.

It is believed that my novel method of forming a filtered solution will be obvious from the foregoing detailed description of an apparatus capable of performing the method.

In Figure 7, I have illustrated an arrangement substantially like that disclosed in my previously mentioned Patent 1,597,911. In this form of sirup machine the agitator 130 is run continuously with the pump 126 by means of a motor 116. The agitator 130 extends into a tank 10' divided into two compartments 11' and 12' by a filtering barrier 13' which may be substantially like the filtering barrier 13 described in connection with the machine illustrated in Figure 1. The container 10' is disposed upon a plurality of legs 14'. Associated with the legs 14' is a shelf 15' upon which is disposed the motor 116 and the pump 126. The motor 116 is adapted to drive a shaft 127 carrying a pulley 128. The shaft 127 is adapted to drive the gear pump 126. A belt 129 connects the pulley 133 of the agitator 132, to the pulley 128 on the shaft 127. Thus it will be seen that the pump 126 and the agitator 130 are at all times driven together by the motor 116.

The bottom of the tank 10' is connected to the inlet of the pump 126 by means of pipe line 60'. The discharge of the pump 126 is connected to the down take pipe 71' by means of a pipe line 61' in which is disposed a control valve 67'. Also disposed in the pipe line 66' is a T 64' connected by piping to a valve 65' communicating with the discharge pipe 63'. Obviously, by operating the valve 65', the liquid in the pipe line 61' may be diverted into the discharge pipe 63'. The end of the down take pipe 71' is equipped with a nozzle 72 for projecting liquid onto the top of the barrier 13'.

The operation of the sirup machine shown in Figure 7, is as follows:

The solute or sugar is first placed on the barrier 13' and then the upper compartment 11' is filled with a suitable liquid such as water. Upon the motor 116 being set into operation, both the pump 126 and the agitator 130 are set to work.

The agitator 130 serves to prevent the solute on top of the barrier 13' from caking. The nozzle 72 aids the agitator 130 in the performance of this duty. Of course, it is to be understood that if it is so desired the nozzle 72 may be made of such a size as to eliminate the necessity of an agitator 130.

The pump 126 serves to create a partial vacuum in the compartment 12'. This results in the liquid above the partition 13' being subjected to a pressure difference, i. e., atmospheric pressure. The pressure upon the liquid in the upper compartment causes it to be forced downwardly through the pores of the filtering barrier 13'. The liquid in being forced through the filtering barrier tends to dissolve any particles of sugar or solute which may become imbedded in the pores of the foraminated material, thus augmenting the dissolving action. Also, the liquid in passing through the filter is subdivided into fine molecules of air and liquid, the air being liberated at the orifice 72 in much the same manner as described in connection with the modification of my invention illustrated in Figure 1. The sirup machine illustrated in Figure 7 has a much greater capacity than the sirup machine illustrated in Figure 1. That is to say, the machine shown in Figure 7 is adapted to produce much more sirup in a given period of time than is a machine such as that disclosed in Figure 1. The increased production is due to the fact that the pump is utilized to aid in the dissolving action by causing the liquid to be sucked through or rather forced through particles of sugar imbedded in the foraminous material.

In Figure 8, I have illustrated diagrammatically a barrier 113' inside of a container 110'. The only difference between this form of my invention and that illustrated in Figure 7 resides in the fact that the pipe 166' is formed into a nozzle 172 which extends through an opening 173 immediately over the filtering barrier 113. The nozzle 172 is disposed immediately on top of the barrier and is adapted to sweep the barrier clean of solid matter and the like which may be deposited thereon. An arrangment such as that illustrated in Figure 8 positively prevents any solid matter from caking on the filtering barrier when the same is subjected to a suction.

It is, of course, to be understood that although I have illustrated and described in detail several embodiments of my invention, the present invention is not to be limited thereby, but only in so far as defined by the scope and spirit of the appended claims.

I claim:—

1. The method of forming a filtered solution which consists in enclosing spaces above and below a filtering barrier filling each space with a liquid, placing a solute in the liquid above the filtering barrier, agitating said liquid and solute above the barrier to cause the solute to be dissolved in said liquid, mixing the liquid below the barrier with the solution above the barrier and circulating the resultant solution through the barrier to filter the same.

2. The method of forming a filtered solution which consists in enclosing spaces above and below a filtering barrier filling each space with liquid, placing a solute in the liquid above the filtering barrier, agitating said liquid and solute above the barrier to cause the said solute to be dissolved in said liquid, applying a suction to the space below the barrier to withdraw the liquid therefrom to create a partial vacuum in said lower space and to generate a pressure difference to force the solution above the filter downwardly through it, and elevating the withdrawn liquid to the space above the barrier to cause it to be mixed with the said solution.

3. In a method of operating a suction filter to form a solution which consists in enclosing spaces above and below the filtering barrier, filling each space with liquid to prime a suction device, placing a solute in the liquid above the filtering barrier, dissolving the said solute in the liquid above the barrier, applying a suction to the space below the barrier to withdraw the liquid therefrom and to generate a pressure difference to force the solution above the filter downwardly through it and conveying the withdrawn liquid to the space above the barrier to mix it with the said solution.

4. The method of filtering a liquid and removing occluded gases therefrom, consisting in disposing the liquid at one side of a filtering and separating barrier the porosity of which is of a proper degree of fineness to separate the occluded gases from the liquid passing through the barrier, reducing the pressure at the other side of the barrier, forcing the liquid through the barrier by the preponderance of pressure at the first mentioned side thereof, and then collecting the liquid and permitting escape therefrom of the entrained bubbles of gas separated from the liquid by the barrier.

5. The method of filtering a liquid and removing occluded gases therefrom, consisting in disposing the liquid at one side of a filtering and separating barrier the porosity of which is of a proper degree of fineness to separate the occluded gases from the liquid passing through the barrier, creating a partial vacuum at the other side of the barrier, forcing the liquid through the barrier by the preponderance of pressure at the first mentioned side thereof, and then collecting the liquid and permitting escape therefrom of the entrained bubbles of gas separated from the liquid by the barrier.

6. The method of filtering a liquid and removing occluded gases therefrom, consisting in disposing the liquid at one side of a filtering and separating barrier the porosity of which is of a proper degree of fineness to separate the occluded gases from the liquid passing through the barrier, reducing the pressure at the other side of the barrier, forcing the liquid through the barrier by the preponderance of pressure at the first mentioned side thereof, and then permitting escape from the liquid of the entrained gases separated from the liquid by the barrier.

7. The method of filtering a liquid and removing occluded gases therefrom, consisting in passing the liquid through a closed circuit, interposing in the circuit of flow of the liquid a filtering and separating barrier of a proper degree of fineness of porosity to separate the gases from the liquid, and then permitting escape of the entrained gases separated from the liquid by the barrier.

8. The method of filtering a liquid and removing occluded gases therefrom, consisting in placing the liquid in a container at one side of a barrier of a proper degree of fineness of porosity to separate the gases from the liquid passing through the barrier, reducing the pressure at the other side of the barrier, forcing the liquid through the barrier by the preponderance of pressure at the first mentioned side of the barrier and then returning the liquid to the container and permitting escape from the collected liquid of the entrained gas separated from the liquid during its passage through the barrier.

9. The method of filtering a liquid and removing occluded gases therefrom, consisting in passing the liquid through a closed circuit including a receiving tank and a barrier interposed in the circuit, the liquid flowing from the tank through the barrier, said barrier being of a proper degree of fineness of porosity to separate the gases from the liquid passing therethrough, and then returning the liquid to the tank and permitting escape of the entrained gases.

10. The method of treating liquids containing occluded gases, consisting in filtering the liquid and simultaneously separating the gases therefrom, and then permitting escape of the entrained gases from the liquid.

11. The method of treating liquids containing occluded gases, consisting in filtering the liquid and simultaneously separating the gases therefrom, and then collecting the liquid and permitting escape therefrom of the separated gases entrained by the liquid as it flows through and beyond the barrier.

In witness whereof, I hereunto subscribe my name this 30th day of April, 1926.

FRANK B. LOMAX.